United States Patent [19]
Melnick et al.

[11] 3,919,044
[45] Nov. 11, 1975

[54] PROCESSES FOR CONCENTRATING AND PURIFYING VIRUSES AND VIRAL ANTIGENS

[75] Inventors: Joseph L. Melnick; Craig Wallis, both of Houston, Tex.

[73] Assignee: Armour Pharmaceutical Company, Phoenix, Ariz.

[22] Filed: Mar. 28, 1973

[21] Appl. No.: 345,570

[52] U.S. Cl. ................................ 195/1.5; 424/89
[51] Int. Cl.² ........................................ A61K 39/12
[58] Field of Search .................................. 195/1.5

[56] References Cited
UNITED STATES PATENTS 3,078,215  2/1963  Fantes ............................ 195/1.5
3,655,509  4/1972  Fields et al. ..................... 195/1.5

OTHER PUBLICATIONS

Wallis et al., *Applied Microbiology*, Vol. 18, pp. 1007–1014, 1969.
Wallis et al., *Applied Microbiology*, Vol. 21, pp. 703–709, 1971.
Wallis et al., *Applied Microbiology*, Vol. 23, pp. 476–480, Mar. 1972.
Wallis et al., *Applied Microbiology*, Vol. 23, pp. 740–744, Apr. 1972.

*Primary Examiner*—Shep K. Rose
*Attorney, Agent, or Firm*—Richard R. Mybeck

[57] ABSTRACT

Viruses and viral antigens harvested from embryonated eggs or tissue culture, whether acid-sensitive or acid-resistant, are purified and concentrated by processes which substantially eliminate the nonviral proteins present in the virus stock and thereafter permit the collection of a solute containing substantially all of the virus and viral antigens which were present in the starting stock. For both acid-resistant and acid-sensitive viruses the processes of the invention comprise the elimination of nonviral protein by filtration or batch adsorption with resins discovered to selectively adsorb certain nonviral proteins. In the case of acid-sensitive viruses, the viruses are stabilized against subsequent acidification by the treatment of the resulting filtrate with a salt selected from the group consisting of ammonium sulfate, sodium sulfate, ammonium chloride and magnesium sulfate to complete the removal of nonviral protein. In both cases the viruses and viral antigens are acidified to pH 3–6 and adsorbed on preselected reactive materials from which the purified and concentrated virus is selectively extracted by elution with an eluent of pH 10–12 or higher which does not impair viral activity.

5 Claims, 2 Drawing Figures

PROCESSES FOR CONCENTRATING AND PURIFYING VIRUSES AND VIRAL ANTIGENS

BACKGROUND OF THE INVENTION

The purification and concentration of viruses are of signal importance, since the nonviral proteins present in vaccine produced from virus harvests obtained from embryonated egg or tissue cultures can sensitize persons inoculated with the vaccine. Similarly, vaccines derived from allantoic fluids or tissues from embryonated eggs of fowl or tissue cultures which contain, in addition to the virus or viral antigens, many nonviral proteins can, upon injection into man or animals, sensitize the patient against the nonviral proteins. Subsequent injections of such materials can result in untoward allergic reactions and sometimes death. It is therefore of prime importance to find a way to prepare vaccines from which such nonviral proteins have been substantially completely removed.

In prior art practices, viruses derived from egg fluids are presently concentrated by a variety of methods. Thus, the adsorption of influenza virus on and elution off insoluble salts, resin exchanges, erythrocytes and a variety of earths has been reported by a number of authors. See: Frommhagen, L. H. et al., *Virology*, Vol. 8, pp. 198–208 (1959); Graham, A. F. et al., *Canad. J. Res.*, Vol. 28, pp. 121–134 (1950); Salk, J. E. *Proc. Soc. Exp. Biol. Med.*, Vol. 46, pp. 709–712 (1941); Shore, B. et al., *Nature*, Vol. 205, pp. 827–828 (1965); Stanley, W. M., *Science*, Vol. 101, pp. 332–335 (1945); Taverne, J. et al., *J. Gen. Microbiol.*, Vol. 19, pp. 451–461 (1958); and Taylor, A. R., *J. Biol. Chem.*, Vol. 153, pp. 675–686 (1944).

None of the methods suggested by these authors are feasible for use with large volumes of virus fluids and they often depend upon the use of partially purified virus to obtain efficient results. Virus stocks must be dialyzed or ultracentrifuged before use with adsorbents to remove interfering salts or organics, or both, which would occupy the reactive sites on the adsorbent and preclude efficient virus concentration.

More recently, it has been reported that influenza viruses could be concentrated and purified by zonal centrifugation. See: Reimer, C. B. et al., *J. Virol.*, Vol. 1, pp. 1207–1216 (1967), and such concentrates have been shown to be effective immunizing antigens. See: Peek, F. B., Jr., *J. Amer. Med. Assoc.*, Vol. 206, pp. 2277–2282 (1968). The laborious and expensive procedures for this type of purification required that the virus be precipitated by barium salts, followed by isopycnic banding in a sucrose gradient with additional steps to remove the contaminating materials used for concentrating the virus. This method yielded a loss of 38 percent of the total virus initially used.

One of the problems heretofore confronting the prior artisan in his effort to purify and concentrate viruses on membranes or other reactive surfaces arises from the fact that such adsorption occurs optimally at acidic pH levels. The purification and concentration of acid-sensitive viruses by this method was precluded because the desirable pH for virus adsorption also denatures the virus or viral antigens.

From the foregoing it becomes apparent that two great needs exist if the production of non-sensitizing vaccines from viruses is to be realized on a commercially feasible scale, namely, the ability to effectively and substantially completely remove nonviral protein from virus and to effectively concentrate the virus without incurring any significant loss in titer from that of the initial harvest, all in an economical and relatively rapid fashion.

In *Applied Microbiology*, March 1972 (published mid-April, 1972) at pp. 476–480, we described a method for elution of virus from membranes by the use of buffers at alkaline pH; and in *Applied Microbiology*, April 1972 (published mid-May, 1972) at pp. 740–744, we described a method for rapid concentration and purification of influenza virus by adsorption on and elution from an insoluble polyelectrolyte.

SUMMARY

This present invention relates to the field of virology and more particularly to new and novel processes for purifying and concentrating both acid-sensitive and acid-resistant viruses which have been harvested from embryonated eggs or tissue cultures to remove therefrom substantially all of the nonviral protein contained in the harvested virus stock.

Specifically, one aspect of the present invention is predicated upon the discovery that acid-sensitive viruses or viral antigens can be stabilized by ammonium sulfate or other selected salts against the deleterious effects of hydrogen ions and that nonviral proteins in virus or viral antigen harvests can be selectively removed by either resin exchangers or reactive membrane surfaces, to provide a process for the rapid purification and concentration of certain viruses whereupon foreign (nonviral) proteins are no longer detectable in the virus or viral antigen concentrate.

Another salient feature of the present invention arises from the surprising discovery that, by integrating a series of newly developed procedures into a single process, viruses derived from embryonated eggs, including chicken, geese and duck (as used herein, the word "egg" shall refer to any of these species), or tissue cultures can be purified and concentrated to provide a final product which is free of detectable nonviral proteins and which contains virtually all of the virus or viral antigens which were present initially in the egg or tissue culture harvest.

As will appear, this invention also provides a process for stabilizing acid-sensitive viruses so that they can be concentrated on membranes or other reactive surfaces, which require that the virus be suspended in acid medium to be adsorbed thereto. Further, this invention also describes a method for eluting viruses from a virus adsorbent without eluting nonviral proteins.

It would be highly advantageous to provide and the present invention is directed to processes for purifying and concentrating both acid-sensitive and acid-resistant viruses and viral antigens harvested from embryonated eggs or tissue culture which remove substantially all of the nonviral protein contained in the harvested virus stock efficiently, practically and economically thereby providing processes which can be operated on a commercially-feasible scale.

Accordingly, it is an object of the present invention to provide novel processes for purifying and concentrating both acid-sensitive and acid-resistant viruses and viral antigens harvested from embryonated eggs or tissue culture without any significant loss in titer and in which substantially all of the nonviral proteins contained in the virus stock are removed and which can be practiced on a commercially-feasible scale.

A further object of the present invention is the provision of processes for concentrating and purifying viruses and viral antigens in large volumes of virus fluids expeditiously, efficiently and economically.

A further object of the present invention is to provide a novel process for purifying and concentrating viruses and viral antigens which substantially completely precludes in the composition of any vaccine prepared therefrom the presence of any foreign nonviral proteins, thereby protecting the patient into whom the vaccine is administered from the risk of sensitization.

Another object of the present invention is to provide a novel process for purifying and concentrating viruses and viral antigens which permits acid-sensitive virus to be adsorbed on a preselected media while disposed within an environment having an acidic pH.

A still further object of the present invention is to provide a new and improved diluent for use in a process of concentrating and purifying viruses and viral antigens.

A further object of the present invention is to provide a novel process for purifying and concentrating viruses and viral antigens which privides methods and agents for selectively eluting viruses from a virus adsorbent without eluting nonviral protein therefrom.

A still further object of the present invention is the provision of a novel process in which both acid-resistant and acid-sensitive viruses and viral antigens may be acidified within a pH 3-6 and adsorbed on a reactive membrane from which the adsorbed viruses and viral antigens are selectively eluted from the reactive membrane with an eluent of pH 10-12 or higher which does not inactivate the viruses or viral antigens.

Still another object of the present invention is to provide a novel process for efficiently, practically, and economically purifying and concentrating viruses derived from tissue culture or egg such as influenza, measles, dengue, mumps, rubella, C-type viruses, cytomegalovirus, vaccinia, canine distemper, canine hepatitis, infectious bovine rhinotracheitis, bovine virus diarrhea, bovine parainfluenza, Newcastle disease, Avian bronchitis, fowl pox, infectious laryngotracheitis, Marek's disease, rabies virus, poliomyelitis, and a number of other viruses (See, for example, USDA Veterinary Biologics Notice No. 15, Aug. 31, 1972) whereby such vaccines can be produced on a commercially-feasible scale.

These and still further objects as shall hereinafter appear are fulfilled by the present invention in a remarkably unexpected fashion as can be readily discerned by a careful consideration of the following detailed description of presently preferred embodiments especially when read in conjunction with the accompanying drawings in which:

DESCRIPTION OF PRESENTLY-PREFERRED EMBODIMENTS contain

Figure 1:
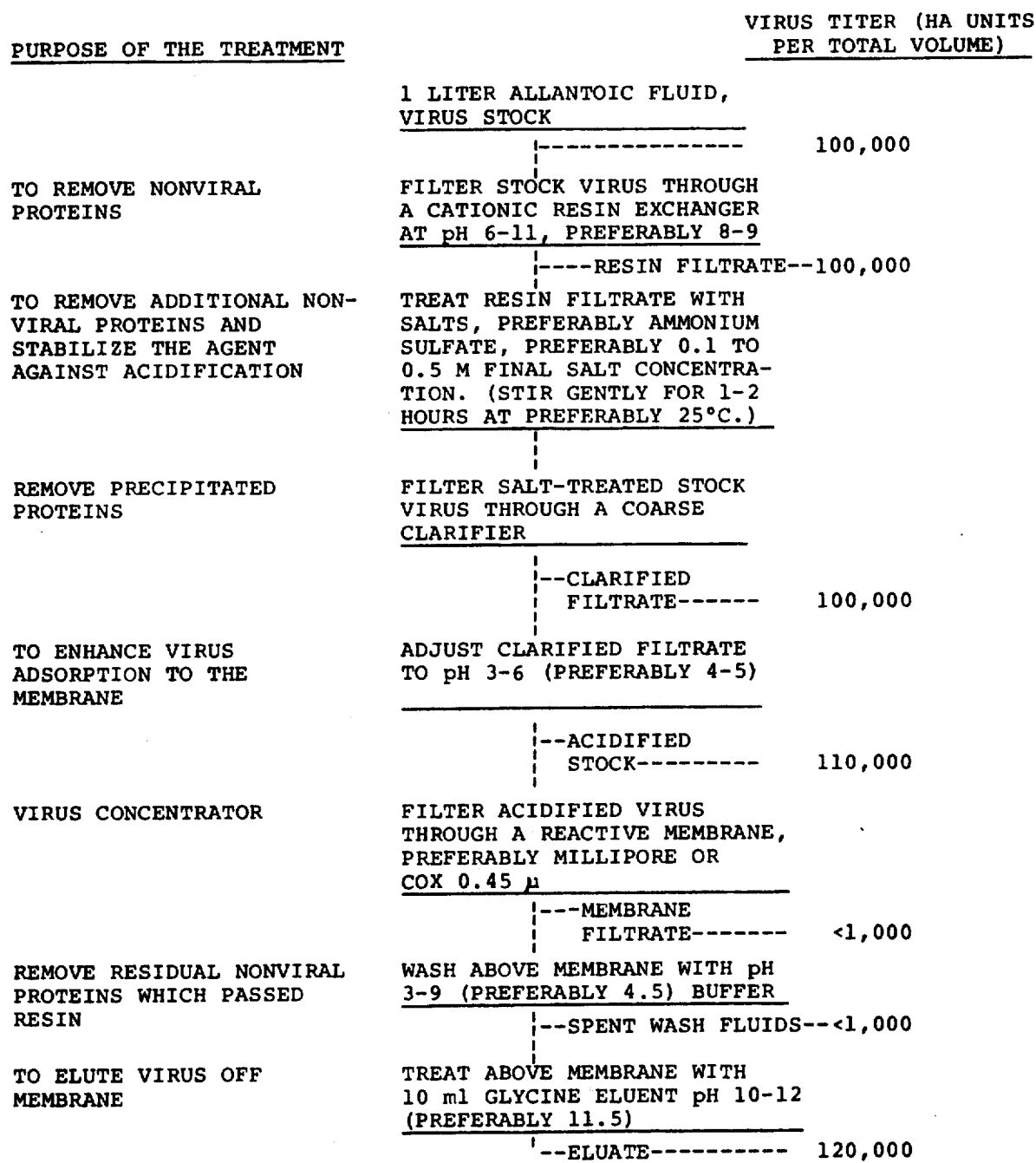
FIG. 1 is a flow diagram demonstrating one embodiment of the present invention applied to acid-sensitive viruses.

In the present invention, solutions containing viruses and viral antigens harvested from embryonated eggs or tissue culture, both acid-sensitive and acid resistant, and having their nonviral proteins removed, are purified and concentrated by adjusting their pH to 3-6, preferably 5, and the acidified solutions are filtered through a reactive membrane, such as the 0.45 micron nitrocellulose membrane manufactured by the Millipore Corp., New Bedford, Mass., which adsorbs all the viruses and viral antigens. The filter or membrane is then washed, such as with 200 or more milliliters of a suitable buffer, saline, buffered saline and the like, having a pH of 3-8 by which all residual nonviral proteins entrapped in the filter system are removed. The viruses and viral antigens adsorbed on the membrane or filter are then eluted with an eluent, which may be any fluid having a pH of 10-12 or higher which does not inactivate the viruses or viral antigens. The eluate is then immediately neutralized. The eluate contains the same virus titer as the initial solution in concentrated and purified form. For example, the viruses and viral antigens are readily eluted by filtering 10 ml, pH 11.5, 0.05 M glycine-NaOH buffer through the membrane and immediately neutralizing the eluate with 0.05 M glycine-HCl buffer, pH 2, so that the final eluate contained a volume of 20 ml and the total HA activity that was initially present in the 1 liter sample.

The eluent may be any fluid having a pH of 10-12 or higher which does not inactivate the viruses or viral antigens, and preferably is buffered and has a pH of 11.5. The eluents may conatin an excess of hydroxyl ions, may include surfactants, i.e., non-ionic detergents such as polysorbate monoleate (Tween 80) readily available on the market. Examples of fluids providing excess hydroxyl ions at elevated pH which are useful in preparing the eluent are potassium hydroxide and sodium carbonate. Other non-ionic detergents or surfactants which may be employed are sodium lauryl sulfate and the like.

Glycine is used as a model buffering agent in combination with any base. Other buffers can be used as efficiently in lieu of glycine, e.g., lysine, tris buffer. If desired, distilled water adjusted to pH 10-12 or higher, and preferably pH 11.5, may be used.

Any desired organic or inorganic acids may be used in acidifying the solution, such as hydrochloric acid, nitric acid, sulfuric acid, acetic acid and the like.

Glycine is also used as a model buffering agent in combination with an acid for acidifying the virus stock. Any of the above buffers can be used as efficiently in lieu of glycine.

Any desired organic or inorganic base may be used in making the solution basic, such as sodium hydroxide, potassium hydroxide, ammonium hydroxide, tris buffer, for example, tris (hydroxymethyl) aminomethane, and the like.

The resin model described above may be replaced with resins of other chemical structures provided the resins function to remove the nonviral proteins in accordance herewith. The amount of resin used is dependent upon the amount of protein present in the virus harvests. A ratio of 1 gram resin per 1 milliliter of undiluted tissue culture harvest or allantoic fluid harvest maintains costs within an economically practical range. It is also expected that the virus adsorbent described below may be replaced by other membranes or reactive surfaces such as epoxy-fiberglass filters of the type produced by Cox Instrument Co., Detroit, Mich., or similar acting filters containing asbestos, cellulose and like substances; polymers such as triacetate produced by the Gelman Instrument Co., Ann Arbor, Mich.; fiberglass and membrane filters containing a variety of reactive substances produced by Finite Filters of Birmingham, Mich.; or the reactive textiles, such as fiberglass, dynel, orlon, and the like, all commercially available.

The processes for removing nonviral proteins from the virus stock are different for acid-sensitive and for acid-resistant viruses and viral antigens. The differences in these processes are illustrated in the flow charts of FIGS. 1 and 2.

Referring first to FIG. 1, virus stock containing acid-sensitive viruses and viral antigens, for example, one liter of allantoic fluid, virus stock, such as influenza virus, having an HA titer of 100,000 units per total volume was filtered through a cationic resin exchanger at a pH of 8–9. The resin filtrate was assayed and found to have the same initial titer, indicating the resin treatment did not affect the antigen titer but did remove nonviral protein. The resin filtrate was then treated with ammonia sulfate salts, preferably in a concentration of 0.1 to 0.5 M and stirred gently for 1–2 hours at 25°C which precipitated nonviral proteins. The salt-treated stock virus was filtered through a coarse clarifier and the clarified filtrate was found to have the same initial titer, indicating that this treatment did not affect the virus or viral antigen titer but did precipitate nonviral protein, giving additional purification to the viral fluids. This treatment effectively removed the nonviral proteins, as previously described. The viral fluids were then acidified within a range of pH 3–6, and preferably 5. The acidified stock was then filtered through a membrane and the membrane was washed with a pH of 3–8, and preferably pH 4.5 buffer which removed residual nonviral proteins. The wash filtrate was assayed and showed less than 1,000 HA units per total volume. The membrane was then treated with an eluent at pH 10–12, such as 0.05 M glycine-NaOH buffer, and the eluate was neutralized such as with pH 2, 0.05 M glycine-HCl buffer to give a final eluate having an HA titer of 120,000 HA units per total volume.

The final product resulted in a fluid containing concentrated virus and viral antigens and no detectable nonviral proteins.

The ammonium sulfate salts used as a model for precipitating virus inhibitory substances from virus fluids can be replaced by the other suitable salts, such as ammonium chloride, sodium sulfate, and magnesium sulfate.

Figure 2:
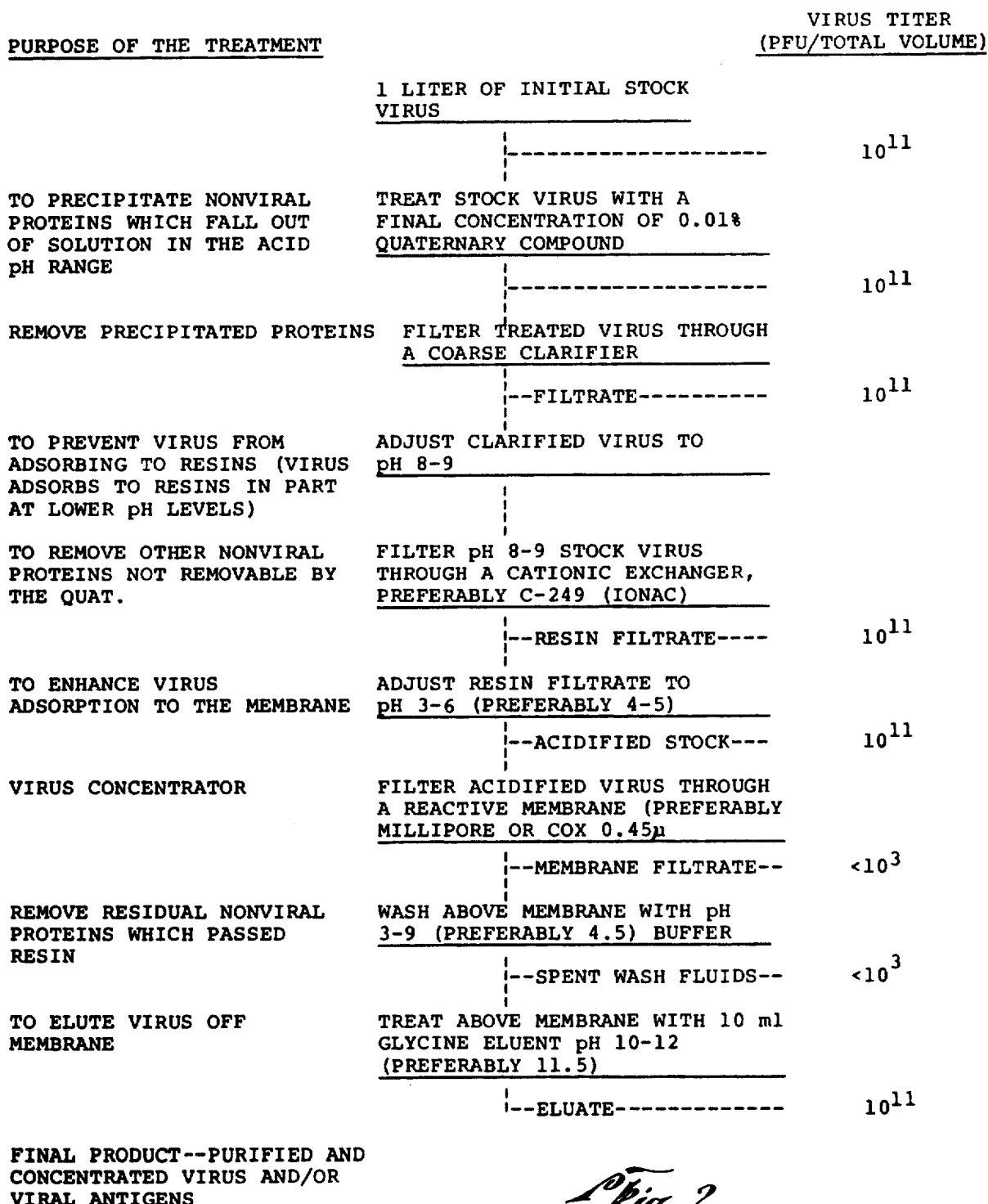
FIG. 2 is a flow diagram demonstrating another embodiment of the present invention applied to acid-resistant viruses.

Referring now to FIG. 2, virus stock containing acid-resistant viruses and viral antigens, for example, Type 1-polio, having a virus titer of $10^{11}$ (pfu total volume) was treated with a concentration of 0.01 percent quaternary compound to precipitate nonviral proteins which fall out of the solution in the acid pH range. The nonviral precipitated proteins were removed by passing the treated stock virus through a coarse clarifier and the filtrate was assayed and found to have a virus titer of $10^{11}$. To prevent the virus from adsorbing to resins, the pH of the clarified virus filtrate was adjusted to pH 8–9 and was filtered through a cationic exchanger, preferably C-249 (Ionac) which removed other nonviral proteins which were not removed by the addition of the quarternary compound. Thus, all nonviral proteins were effectively removed. The resin filtrate was assayed and found to have the same titer as the initial stock virus. As previously described, the resin filtrate was adjusted to pH 3–6, and preferably 5, to enhance virus adsorption to the membrane, and the acidified stock virus was filtered through a reactive membrane, preferably millipore or Cox 0.45 $\mu$. The membrane filtrate was assayed and found to have less than $10^3$ titer and the membrane was washed with a pH 3–4 buffer to remove residual nonviral proteins which pass the resin. The spent wash fluids were assayed and found to have less than $10^3$ titer. The membrane was then treated with a suitable eluent, pH 10–12, 0.05 M glycine-NaOH buffer to elute the virus and viral antigens off the membrane and the eluate was neutralized, such as with pH 2, 0.05 M glycine-HCl buffer. The eluate was assayed and found to have the same titer as the initial stock virus and no detectable nonviral protein thus providing an concentrated and purified product.

In one practice of the present invention to be now described, influenza virus type A (PR8 strain) shall be hereinafter referred to as "influenza virus," and its hemagglutinating antigen shall be referred to hereafter as "HA."

The HA derived from harvesting allantoic fluids of embryonated chick eggs infected with influenza virus was purified and concentrated in accordance wtih the following:

One liter of influenza-infected allantoic fluids was filtered through a 1000-gram column of resin exchanger (C-249, Ionac Incorporated, Na$^+$ charged, 20–50 mesh) to remove a portion of nonviral proteins. The resin filtrate was then treated with a final concentration of 0.1 to 0.5 M ammonium sulfate to precipitate any residual proteins. After the sulfate was added, the mixture was gently mixed, preferably for 30 minutes at approximately 25°C. Ambient and temperatures of above freezing to elevated temperatures which do not deleteriously affect the viruses and viral antigens may be used. The time required to form the precipitate may vary from about 30 minutes to 2 hours, depending on temperature. Then, the ammonium sulfate-treated allantoic fluid was filtered through a coarse membrane (5–20 microns) which removed the formed precipitates.

The clarified allantoic fluids were then pH adjusted to a pH of about 3 to 6, preferably to pH 5, with HCl or any other acid substances. The acidified allantoic fluid was then filtered through a suitable virus adsorbent, such as the 0.45 micron nitrocellulose membrane manufactured by the Millipore Corporation, New Bedford, Mass. The filtrate was tested and found devoid of any HA activity which confirmed that all the influenza antigen was adsorbed onto the membrane. Next, the membrane was washed with 200 or more milliliters of a suitable virus fluid (saline, buffered saline, or the like, at approximately pH 3–9) and all residual allantoic fluids entrapped in the filtered system were removed therefrom without eluting any significant amounts of HA.

The HA adsorbed on the virus adsorbent was then eluted by filtering 10 ml, pH 11.5, 0.05 M glycine-NaOH buffer through the membrane and immediately neutralizing the eluate with 10 ml of 0.05 M glycine-HCl buffer, pH 2, so that the final eluate contained a volume of 20 ml and the total HA activity that was initially present in the 1 liter sample. The viruses or viral antigens adsorbed to membranes or other reactive surfaces are shown to be preferentially eluted without elution of any trace nonviral proteins which may also be adsorbed by the membranes or reactive surfaces by an eluent having a pH of 10–12.

Thus, acid-sensitive viruses and viral antigens, such as influenza virus, are rendered acid-resistant by treating the initial resin filtrate obtained with ammonium sulfate or other suitable salts which precipitate certain proteins present in the virus harvest which under acid conditions inactivate or adsorb the virus or viral antigens. This latter precipitate, after removal by filtration through corase filter paper, yields a filtrate containing virtually the total virus initially present in the harvest. Now the harvest can be acidified for concentration on membranes or other reactive surfaces. Whether ammonium sulfate or the other salts directly stabilize the virus in acid medium or whether the salt precipitates a stabilizing factor is yet to be resolved. Regardless, influenza virus and like viruses and viral antigens are shown to be processable at relatively low pH levels in ammonium sulfate salts and the other salts without deleterious effect upon either the virus or the antigen.

By acid stabilization of influenza virus as herein described, we were able to concentrate 50 percent of the virus of HA on membranes at pH 4–5. Thus, it was apparent that there still remained in the harvest excess organic compounds which compete with the virus or HA for reactive sites. This problem is controlled by the use of resins as described below.

Also disclosed herein is one surprising discovery that certain resin exchangers have the ability to adsorb nonviral proteins from virus harvests (either embryonated egg or tissue culture harvests) without adsorbing virus or viral antigens, thereby semi-purifying the virus preparation. It is further shown that this adsorption phenomenon is not one of ion exchange chromatography, but rather is due to the adsorption of proteins by the resin backbone or polymer structure as shown by the use of samples of resin obtained from the manufacturer prior to their being sulfonated (and thus not having the ability to perform as an ion exchanger) to obtain essentially the same results. Although we show the cationic exchange resin sold as No. C-249 by the Ionac Company, Birmingham, N.J., a resin having a polystyrene matrix cross-linked with divinyl benzene, resins having a backbone structure or matrix of acrylic or phenolic composition give similar results. Since these exchangers are readily available commercially, they were used routinely.

Once virus is concentrated on virus adsorbents (in the form of membranes, glass beads, textile surfaces or like reactive surfaces), along with residual nonviral proteins which may have escaped removal by the ammonium sulfate and resin treatments, we are able to preferentially elute virus off the membrane using our eluent without eluting nonviral proteins, resulting in a highly purified virus and viral antigen concentrate.

In the foregoing, and in the examples hereinafter presented, a number of standard test procedures are referred to. Descriptions of the methods used for determining HA titers, other virus titers and protein concentrations may be found in the references described below:

i. HA titers are determined by making serial dilutions of the allantoic or other fluids containing HA in saline and mixing the diluted HA with an equal volume of 0.5 percent guinea pig erythrocytes. After shaking and incubation of the mixtures at 4°C for 1–3 hours, the highest dilution of allantoic fluids or other fluids containing HA which produces hemagglutination of the guinea pig red blood cells is considered the HA titer. (See "Diagnostic Procedures for Viral and Rickettsial Infections," E. H. Lennette and N. J. Schmidt, eds., 4th edition, *Amer. Publ. Hlth. Assoc.*, 1969).

ii. Total protein is determined by the Lowry method. Lowry, O. H., J. N. Rosebrough, A. L. Farr, and R. J. Randall. Protein measurement with the Folin phenol reagent. *J. Biol. Chem.*, Vol. 193, pp. 265–275 (1951).

iii. A more sensitive system for quantitation of protein has been described by Wallis and Melnick. Detection of protein contaminants in biological preparations by discontinuous counterimmunoelectrophoresis. *Infect. J Immun.*, Vol. 6, pp. 557–560 (1972). When the sensitivity of the Lowry test is inadequate, this new method is used.

iv. Plaque forming unit method. See Melnick, J. L. and Wenner, H. A., Enteroviruses. In "Diagnostic Procedures for Viral and Rickettsial Infections," 4th ed., 1969, *Am. Publ. Hlth. Assoc.*, New York.

Although this disclosure emphasizes the purification and concentration of viruses derived from infecting embryonated eggs, viruses derived from tissue culture fluids and harvests may also be concentrated as described above with certain modifications. For instance, the acid-resistant viruses do not require to be stabilized by ammonium sulfate, and therefore this step may be omitted when treating such virus, such as described in relation to the flowchart of FIG. 2. However, it should be noted that by acidifying acid-resistant viruses, certain undesirable nonviral proteins can be precipitated and eliminated from the harvest by acidification. In the case of viruses grown in monkey kidney cells, pH 4.5 appears to be optimal pH for developing the maximum precipitate. However, the exact pH value for optimal results may vary depending on the types of cells used, the age of the cells, and the medium used to maintain the cells. Therefore, within the range defined, the optimal pH to force proteins out of solution can vary slightly between cells.

An additional discovery arose when we realized that the proteins precipitated at pH 4.5 were also capable of being precipitated by quaternary compounds. Thus, by the addition of a final concentration of 0.01 percent alkyldimethylbenzylammonium chloride (Roccal), which was used as a model quaternary compound, the same results were obtained as described above using acidification to precipitate these proteins.

It should also be noted that when allantoic fluids derived from influenza virus-infected eggs are acidified in the absence of stabilization by salts, a precipitate forms. Surprisingly, this precipitate does in fact adsorb the virus, and when the acidified materials are assayed, no detectable virus is evident. The virus was first believed to have been inactivated since solubilizing the precipitate by dilution did not yield the virus. However, when we used the alkaline buffer process to elute viruses from adsorbents, we solubilized the virus from the precipitate and discovered that the precipitate did not inactivate the influenza virus, but rather merely attached itself to reactive sites of the virus to prevent the virus from reacting with the red blood cells used for hemagglutinin assay of virus activity. Thus, by using an indigenous protein present in the virus harvest, we can concentrate and purify influenza virus by precipitating the egg proteins and thereafter concentrating the virus thereon. In practice, we now are able to simply and efficiently concentrate influenza virus as follows:

One liter of allantoic fluid is adjusted to pH 5.0 at 4°C, and the precipitate is allowed to ripen for 1–2 hours, while being gently stirred to afford a good collision efficiency between the virus and the precipitating proteins. The precipitated allantoic fluids are then filtered through a coarse Whatman No. 40 paper to trap the precipitate. Assay of the filtrate indicates no detectable virus activity, indicating that the virus was trapped along with the precipitate on the filter. The precipitate is then solubilized with 10 ml pH 12, 0.05 M glycine-NaOH buffer and immediately neutralized with 10 ml pH 2 buffer.

The eluate was assayed and found to contain the total amount of virus initially present in the one liter volume of allantoic fluid. The virus was concentrated rapidly and efficiently, but was now contaminated with nonviral egg protein derived from solubilizing the precipitate to obtain the virus. Therefore, the 20 ml of eluate was treated with ammonium sulfate or the other salts as earlier described, and that eluate was acidified to about pH 5, whereupon all the protein in the eluate precipitated without inactivating or precipitating the virus. Upon removal of this precipitate, all original virus is contained in fluids free of detectable nonviral protein, for there was no detectable loss of virus titer.

To further aid in the understanding of the present invention and not as a limitation thereof, the following examples are presented:

EXAMPLE I

Using the PR8 strain of influenza virus as a model agent, undiluted virus stock in the form of allantoic fluid harvests was treated with ammonium sulfate as a model salt at different concentrations for 15 min. A precipitate formed which was removed by centrifugation, and the supernatant fluids were assayed for HA activity. This procedure was performed to determine what was the lowest concentration of ammonium sulfate which would remove the cold-acid precipitate without affecting the virus HA titer. To determine whether the factor in the egg fluids which precipitated at acid levels in the cold had been removed, portions of the supernatant fluids described above were adjusted to pH 5.5 (where the precipitate rapidly forms) and held in an ice bath. The degree of turbidity was recorded. The experimental procedures and results of this test are shown in Table 1 below. At final concentrations of 40 percent saturated ammonium sulfate or lower, no detectable HA activity was removed by the sulfate. The control virus samle (treated with water in lieu of sulfate) held for 3 hr. at pH 5.5 manifested a massive precipitate. The precipitate was not evident in samples treated with ammonium sulfate at final concentrations of 10 percent or higher saturation.

Table 1.

| Partial purification of influenza virus with ammonium sulfate | | |
|---|---|---|
| Final concentration of saturated ammonium sulfate (%)* | HA titer of supernatant fluids | Precipitates formed at pH 5.5** |
| None, saline control | 640 | Gross |
| 50 | 80 | None |
| 40 | 320 | None |
| 30 | 640 | None |
| 20 | 640 | None |
| 10 | 640 | None |
| 5 | 640 | Slight |
| 2.5 | 640 | Gross |

*Undiluted virus stock in allantoic fluid was mixed with an equal volume of saline (0.15 M NaCl) or with saturated ammonium sulfate (at 25°C) to give the final concentrations indicated. Samples were shaken on a rotary unit for 15 min. at 25°C, and tubes were then centrifuged at 3,000 rpm for 5 min. to sediment precipitates. The supernatant fluids were then assayed for hemagglutination (HA) activity.
**Samples of the supernatant fluids prepared as described above were adjusted to Table 1.-continued

| Partial purification of influenza virus with ammonium sulfate | | |
|---|---|---|
| Final concentration of saturated ammonium sulfate (%)* | HA titer of supernatant fluids | Precipitates formed at pH 5.5** | pH 5.5 and held at 4°C for 3 hr. to determine the presence of a precipitate which ripens in the cold at acid pH levels.

EXAMPLE II

Since the acid-cold precipitate could be removed by ammonium sulfate precipitation, as shown in Example I, the role of ammonium sulfate on the stability of influenza virus at acid pH levels was next investigated. Undiluted influenza virus (strain PR8) as present in whole allantoic fluid was treated with saline or a final concentration of 10 percent saturated ammonium sulfate, and the pH was adjusted from 4.0 to 8.0. After 3 hr. at 4°C, the degree of precipitation was recorded and HA activity was assayed. The results are shown in Table 2 below. Precipitates were formed in ammonium sulfate-free samples at pH 6.0 and increased in amount with lowering of pH. Virus survival in acid medium was inversely related to formation of precipitates. As precipitates formed, HA activity could no longer be detected in the supernatant fluids.

Table 2.

| | Stabilization of influenza virus by ammonium sulfate in acid medium | | | |
|---|---|---|---|---|
| pH of suspension* | Virus-saline mixture | | Virus-ammonium sulfate mixture | |
| | Ha titer | Precipitate | HA titer | Precipitate |
| 8.0 | 640 | None | 640 | None |
| 7.0 | 640 | None | 640 | None |
| 6.0 | 640 | Slight | 640 | None |
| 5.0 | 40 | Gross | 640 | None |
| 4.5 | 20 | Gross | 320 | None |
| 4.5 | 20 | Massive | 160 | None |

*Whole, infected allantoic fluids were treated with saline or ammonium sulfate (nine parts virus plus one part saline or one part saturated solution of ammonium sulfate). Samples were shaken for 15 min. on a rotary mixer and centrifuged, and supernatant fluids were obtained and adjusted to the pH levels indicated. After 3 hr. of storage at 4°C at the pH range indicated, the degree of precipitation in samples was recorded, and samples were then assayed for hemagglutination (HA) activity. (Precipitates were removed by centrifugation prior to assay.)

EXAMPLE III

The experiments reported as Examples I and II, raised the question of whether influenza virus is truly acid-sensitive. The formation of precipitates may bind virus, which would be removed with the precipitate. On the other hand, virus suspended in a final concentration of 10 percent saturated ammonium sulfate was not precipitated at pH levels as low as 4.0. HA activity was completely stabilized even when the pH decreased to 5.0, and there was significant stability even at pH 4.0.

EXAMPLE IV

Ten liters of allantoic fluids derived from influenza virus type A infected chick embryos, having an HA titer of 1:3200 per 0.5 ml and a total protein of 2.5 mg/ml were filtered through a column containing 10,000 grams of C-249 resin. The filtrate was assayed and found to have an HA titer of 1:3200 and 1.0 mg/ml total protein, indicating the resin treatment did not affect the antigen titer but did remove nonviral protein. The 10 liter resin filtrate was then treated with ammonium sulfate salts to give a final concentration of 0.5 M. After stirring this mixture for about 30 minutes at 25°C, the precipitate that formed was removed by filtration through coarse filter paper (Whatman No. 40), and the precipitate-free filtrate was assayed and found to have an HA titer of 1:3200 and a total protein of 0.04 mg/ml, indicating this treatment did not affect the virus or viral antigen titer but did precipitate nonviral protein, giving additional purification to the viral fluids. The viral fluids were then adjusted to pH 5.0 with 1 N HCl, and the acidified fluids were assayed and showed no changes in HA titer or protein (1:3200 and 0.04 mg/ml, respectively). The acidified fluids were then filtered through a 142-mm 0.45 micron sterile nitrocellulose membrane (Millipore Corp.), and the filtrate was assayed and was found free of any detectable HA or protein. This indicated that the viral antigens were wholly adsorbed to the membrane along with the tract amounts of nonviral protein. The membrane was then washed with 200 ml buffered salt solution at pH 5.5 to remove residual fluids trapped in the filter system and this wash filtrate was assayed and showed no detectable HA or protein, indicating the HA and protein remained on the membrane. The membrane was then treated with pH 12, 0.05 M glycine-NaOH buffer and the eluate was neutralized with ½ liter pH 2, 0.05 M glycine-HCl buffer to give a final eluate of 1 liter or a 10X concentrate. This final eluate contained an HA titer of 1:32,000, indicating a recovery of 100 percent of the virus antigen and did not contain any detectable protein, indicating the eluent used preferentially eluted viral antigens and not nonviral protein. Additional tests with this eluate using the discontinuous counterimmunoelectrophoresis test showed that we were unable to detect nonviral protein. This method has a sensitivity 1000-fold greater than the conventional Lowry test.

Although we have used a 1:1 ratio of resin and virus harvest in this example, other ratios are also efficient. The concentration of resin is dependent on the concentration of tissue culture cell-synthesized products or organic compounds present in the embryonated egg (which depends on the age of the egg, and other factors, such as temperature of incubation of eggs, etc.). Thus pretitration of these interfering compounds can be accomplished with each lot of virus harvest to determine the optimal ratio of resin for use.

EXAMPLE V

In this example, allantoic fluids derived from harvesting embryonated eggs infected with influenza viruses (types A, B and C), measles virus, rubella virus, variola, vaccinia or mumps, were processed as described in Example IV, and these viruses or their antigens were purified and concentrated as described for influenza virus type A in that Example. After such processing, the viruses referred to above were freed of nonviral protein and were concentrated so that there was no detectable loss of infectivity, antigen or other product used for titration of the virus or its component parts.

EXAMPLE VI

Ten liters of fluids derived from harvesting monkey kidney tissue culture cells infected with type 1 poliovirus containing a titer of $10^8$ plaque forming units (PFU)/ml or a total of $10^{12}$ PFU) were acidified to pH 4.5 with 1 N HCl. Since this virus is acid-resistant, the stabilization of the virus by ammonium sulfate treatment as described in Example IV is not necessary. However, acidification as described forces out of solution undesirable nonviral proteins, which are then removed from the harvest. Thus, the acidified virus was allowed to stir gently at 25°C for 1 hr, or at 4°C, 37°C or other temperatures, whichever are most convenient, as long as sufficient time is allowed for the precipitate to ripen. (Such information is obtained by experimentation with the virus stock) and the precipitate was removed by filtration of the acidified virus through a coarse filter paper. The clarified, acidified virus harvest was then adjusted to basic pH levels, preferably pH 7–11, in this case pH 9 for filtration through the resin exchanger as described in Example IV, so that additional nonviral proteins can be removed (filtration at lower pH levels affects virus removal). The resin filtrate was then adjusted to pH 2–6, preferably pH 3.5, a pH level most conducive for purified virus to be adsorbed to nitrocellulose or other reactive membranes. The re-acidified harvest was then filtered through an 0.45 micron membrane as described in Example IV, and the final eluate obtained according to the methods described in Example IV contained a virus concentrate free of detectable nonviral protein and with a titer of $10^{12}$ PFU/total eluate. By the DCIE test we were unable to detect any nonviral protein, indicating a removal of at least 1000-fold protein since our indicator system showed that the untreated virus harvest reacted at a 1000-fold dilution with antibody made against the cell protein in which virus was initially grown.

EXAMPLE VII

When fluids derived from harvesting tissue culture cells infected with other representative acid-resistant viruses, i.e., echoviruses 1, 7 and 9, and coxsackieviruses A9 and B1-6, were processed as described in Example III, these viruses or their antigens are purified and concentrated as described for polio-virus type 1 in Example VII. After the process as described in Example VII, the viruses referred to above are freed to nonviral protein and are concentrated so that there is no detectable loss of infectivity, antigen or other product used for titration of the virus or its component parts.

EXAMPLE VIII

Ten liters of fluids derived from harvesting monkey kidney tissue culture cells infected with herpesvirus, an acid-sensitive virus, containing a titer of $10^7$ PFU/ml, were filtered through 10,000 grams of C-249 cation exchange resin, and the filtrated was then treated with ammonium sulfate as described in Example IV. After stirring for about 30 min at 25°C, the treated tissue culture fluids were filtered through a coarse filter paper to remove protein precipitates, and the clarified filtrate was then adjusted to pH 5 with 1 N HCl. The acidified tissue culture fluids were then filtered through a 142-mm 0.45 micron nitrocellulose membrane (Millipore Corp.), and the membrane was washed with 1 liter of saline buffered at pH 5.5. The membrane was then treated with ½ liter pH 11.5 eluent (0.05 M glycine-NaOH buffer), and the eluate was neutralized to pH 7.5 with ½ liter pH 2 glycine-HCl buffer. The PFU titer of the final eluate was $10^8$ PFU/ml, indicating a concentration of 10X. No nonviral proteins could be detected in the final eluate by the DCIE test.

EXAMPLE IX

When fluids derived from harvesting tissue culture cells infected with other representative acid-sensitive viruses, i.e., vaccinia virus, cytomegalovirus, SV40, respiratory syncytial virus are processed as described in Example VIII, these viruses or their antigens are purified and concentrated as described for herpesvirus in Example VIII. After the process as described in Example VIII, the viruses referred to above are freed of nonviral protein and are concentrated so that there is no detectable loss of infectivity, antigen or other product used for titration of the virus or its component parts.

EXAMPLE X

Ten liters of allantoic fluids derived from influenza virus type A-infected chick embryos, having an HA titer of 1:3200 per 0.5 ml and a total protein of 2.5 mg/ml were adjusted to pH 5.0 at 4°C with 1 N HCl and gently stirred for 1–8 hours, preferably 2 hrs, to allow a precipitate to ripen. The 10 liters of precipitated influenza virus allantoic fluids were filtered through Whatman filter paper No. 40 and the filtrate was found to have 1.5 mg/ml protein and less than 1:10 HA activity. (This filtrate was discarded.) The precipitate trapped on the filter paper was washed by passing 1–2 liters of pH 5 cold buffered salt solution through the filter paper, and no detectable protein was found in the filtrate wash nor any detectable HA activity. The precipitate trapped on the filter paper was then solubilized by passing ½ liter of pH 12, 0.05 M glycine-NaPH buffer through the filter paper slowly and then immediately neutralizing the solubilized precipitate with ½ liter 0.05 M glycine-HCl buffer giving a 10-fold concentration. Assays of this eluate indicated an HA titer of 1:32000 and 1.5 mg/ml protein. The 1 liter eluate was then treated with ammonium sulfate salts to give a final of 0.5 M, and this mixture was stirred for one-half to 4 hours, preferably 1 hours, to allow the salt to precipitate the nonviral proteins. The precipitated eluate was then filtered through paper as described above; the filtrate was collected and was found to contain the total HA activity (1:32000) and no detectable protein by either the Lowry test or the DCIE test. The excess ammonium sulfate is then removed by adjusting the pH of the described filtrate to pH 5 with 1 N HCl and filtering the fluids through a membrane as described in Example IV. The filtrate was assayed and found free of HA activity. After washing the membrane and eluting the viral antigens as described in Example IV, a 1 liter final eluate is obtained which contained all the HA activity initially present in the 10 liter starting fluids without any detectable nonviral protein.

EXAMPLE XI

When allantoic fluids derived from harvesting embryonated eggs infected with influenza viruses (types A, B and C), measles virus, rubella virus, variola, vaccinia or mumps, are processed as described in Example X, these viruses or their antigens are purified and concentrated as described for influenza virus type A in Example X. After being subjected to the process as described in Example X, these viruses are freed of nonviral protein and are concentrated so that there is no detectable loss of infectivity, antigen or other product used for titration of the virus or its component parts.

EXAMPLE XII

In certain instances, some manufacturers presently concentrate and semi-purify influenza vaccine by filtration through calcium phosphate colums, which only removes between 50–85 percent of the nonviral protein. The semi-purified virus concentrates described above can then be stabilized by the salt method described in this description, and then concentrated on and eluted off reactive membranes to yield a highly purified preparation which would be more desirable for vaccination purposes.

One liter of influenza virus was filtered through a calcium phosphate column, and the virus adsorbed thereto was then eluted with a salt solution at pH 10–11. The eluate contained 100 percent of the initial input virus, but also contained about 15 percent of the allantoic nonviral proteins. This eluate was then treated with a final of 0.1 to 0.5 M ammonium sulfate to stabilize the virus, and the precipitate which formed was removed by clarification through a coarse filter. The clarified virus was then adjusted to pH 4–6, and filtered through a reactive membrane as described in this description. The membrane filtrate had no detectable HA activity. The membrane was then washed with a buffer to remove residual fluids. The virus was eluted off the membrane with pH 11–12 buffer, and the final eluate contained the total activity initially contained in the virus stock. No detectable nonviral proteins were evident when tested by the methods delineated above.

EXAMPLE XIII

In this example, canine distemper virus, an acid-sensitive virus, is processed as described in Example IV resulting in the virus or antigen being purified and concentrated, freed of nonviral protein, without any detectable loss of infectivity, antigen or other product used for titration of the virus or its component parts, as in the case of influenza virus type A.

EXAMPLE XIV

In this example, canine hepatitis virus, an acid-resistant virus, is processed as described in Example VI resulting in the virus or antigen being purified and concentrated, freed of nonviral protein, without any detectable loss of infectivity, antigen or other product used for titration of the virus or its component parts, as in the case of poliovirus processed according to Example VI.

While the foregoing examples illustrate concentration and purification of a variety of specific viruses and viral antigens, the processes of the present invention advantageously may be used to concentrate and purify other viruses or viral antigens, both acid-sensitive and acid-resistant, such as dengue, C-type viruses, infectious bovine rhinotracheitis, bovine virus diarrhea, bovine parainfluenza, Newcastle disease, Avian bronchitis, fowl pox, infectious laryngotracheitis, Marek's disease, rabies virus, and a number of other viruses, see, for example, USDA Veterinary Biologics Notice No. 15, Aug. 31, 1972, as well as others.

The present invention, therefore, is well suited and adapted to attain the objective and has the advantages mentioned as well as others inherent therein.

While numerous examples of the disclosure have been given for purposes of disclosure, changes in parameters, details and materials may be made which are within the spirit of the invention as defined by the scope of the appended claim.

What is claimed is:

1. A method of purifying and concentrating acid-resistant viruses and viral antigens for vaccination from an initial stock solution containing acid-resistant virus and viral antigens and non-viral proteins which, upon vaccination will sensitize and otherwise cause untoward allergic reactions, said method comprising:

a. treating said stock solution with 0.01 percent alkyldimethylbenzyl ammonium chloride to precipitate from said solution said non-viral proteins which fall out of solution in an acid pH range;

b. filtering said treated solution through a coarse clarifier to remove the precipitated proteins therefrom;

c. adjusting the pH of said clarified solution to 8–9 to prevent virus from adsorbing to resins;

d. filtering said pH 8–9 clarified solution through a cationic resin exchanger to remove any remaining non-viral proteins from said solution and provide a resin filtrate;

e. adjusting the pH of said resin filtrate to 3–6 to enhance virus adsorption to a membrane;

f. filtering said acidified resin filtrate through a 142 mm - 0.45 micron reactive membrane, formed of a material selected from the group consisting of nitrocellulose, epoxy-fiberglass, asbestos, cellulose, triacetate polymers, fiberglass, or reactive textiles, to concentrate the virus on said membrane;

g. washing said membrane with a buffer having a pH 3–9 to remove all residual non-viral proteins therefrom;

h. treating said washed membrane with glycine eluent at pH 10–12 to elute the virus from said membrane; and i. collecting said eluate which consists of purified and concentrated virus and viral antigens.

2. The method of claim 1 in which step (e) comprises adjusting the pH of said resin filtrate to 4–5.

3. The method of claim 1 in which step (g) comprises washing said membrane with a buffer having a pH of 4.5.

4. The method of claim 1 in which step (h) comprises treating said membrane with an eluent consisting of M glycine-NaOH buffer at pH 11.5.

5. The method claim 1 in which said virus and viral antigens are selected from the group consisting of influenza, measles, dengue, mumps, rubella, C-type viruses, cytomegalo-virus, vaccinia, canine distemper, canine hepatitis, infectious bovine rhinotracheitis, bovine virus diarrhea, bovine parainfluenza, Newcastle disease, Avian bronchitis, fowl pox, infectious laryngotracheitis, Marek's disease, rabies virus, poliomyelitis variola, herpes virus, respiratory synctial, echoviruses 1, 7 and 9, coxsackie viruses A9, B1-6and canine hepatitis, said viruses known to be acid resistant being processed "as is" and those viruses known to be acid sensitive being rendered acid-resistant and then processed.

* * * * *